United States Patent
Lin et al.

(10) Patent No.: US 6,406,188 B1
(45) Date of Patent: Jun. 18, 2002

(54) BALL BUSHED BEARING SCREW BOLT AND NUT

(75) Inventors: Huang-Ming Lin, Taichung County; Slady Hsu, Taichung, both of (TW)

(73) Assignee: Hiwin Technologies Corp., Taichung City (TW)

( * ) Notice: Subject to any disclaimer, the term of this patent is extended or adjusted under 35 U.S.C. 154(b) by 0 days.

(21) Appl. No.: 09/663,137

(22) Filed: Sep. 15, 2000

(51) Int. Cl.[7] .......................... F16C 33/60; F16H 25/22
(52) U.S. Cl. ...................... 384/504; 74/89.23; 384/537
(58) Field of Search .................. 74/424.82–424.89, 74/89.23; 384/43, 499, 500, 502, 504, 512, 515, 519, 537

(56) References Cited

U.S. PATENT DOCUMENTS

| | | | | |
|---|---|---|---|---|
| 2,455,368 A | * | 12/1948 | Hoffar | 74/424.86 |
| 3,367,201 A | * | 2/1968 | Orner | 74/424.86 |
| 3,651,550 A | * | 3/1972 | Bennett | 384/504 X |
| 4,939,946 A | * | 7/1990 | Teramachi | 384/43 X |
| 5,127,285 A | * | 7/1992 | Granhom | 74/89.23 X |

* cited by examiner

Primary Examiner—Thomas R. Hannon
(74) Attorney, Agent, or Firm—Bacon & Thomas, PLLC

(57) ABSTRACT

The bearing bush employed is divided into a main and a sub bearing bushes which are removable when filling the bearing balls into the bearing grooves so as to facilitate assembly work, moreover, weakening of preload on the preloaded ring can be compensated by adjusting the thickness of the preloaded ring by means of grinding.

5 Claims, 4 Drawing Sheets

BALL BUSHED BEARING SCREW BOLT AND NUT

BACKGROUND OF THE INVENTION

1. Field of the Invention

The present invention relates to a ball bushed bearing screw bolt and nut, and more particularly, a ball bushed bearing screw bolt and nut having a bearing bush around a ball bearing nut so as to decrease the frictional rotating resistance between the ball bearing nut and the bearing bush.

2. Description of the Prior Art

A ball bushed bearing screw bolt and nut is a mechanism which can inversely convert rotating power inputted from a ball bushed bearing nut into an linear thrust force along the axial direction of the screw bolt and nut. Since the motion of a ball bushed bearing nut is a rotational motion with respect to the apparatus it belongs, it is a conventional method to provide a slanted ball bearing between the screw nut and the mechanism bolt so as to minimize the frictional resistance therebetween. It has an inherent advantage that the slanted ball bearing has ability to withstand an axial load so as to maintain the apparatus in a definite position, but it has an inherent disadvantage that its structure is complicate and bulky as well.

One of the well known improved designs is shown in FIG. 6, as shown in FIG. 6, a ball bearing nut 2 is screw combined with a screw bolt 1, and a plurality of rolling balls 3 are rolling therebetween. A bearing bush 5 is further contactually surrounding on the ball bearing nut 2. A plurality of screwed grooves 21 and 51 are formed transversely along respective surfaces of the ball bearing nut 2 and the bearing bush 5 facing each other with a plurality of bearing balls 4 interposing therebetween. So as to make the two elements ball bearing nut 2 and bearing bush 5 relatively rotate with a low friction. A flange 52 is formed at the left side (see FIG. 6) of the bearing bush 5 with several threaded holes 53 thereon for engaging the mechanism to a load. In addition, for evading the infringement of dust into the bearing grooves 21, 51, a dust ring 8 is provided at the end terminal of the bearing bush 5. Since the bearing balls 4 have to withstand considerably strong axial force so that the outer diameter at the outer side of the bearing groove 21 is much greater than its minimum outer diameter with the result that the bearing bush 5 is shifted away from the axis center of the screw bolt 1 when assembling the bearing balls 4, and then filling the bearing balls 4 into the bearing grooves 21 and 51 through the largest clearance therebetween. In this situation, the possible amount of fillable bearing balls 4 are, at the most, ⅔ of maximum amount. This causes lowering withstandable load that further brings about the necessity of enlarging the diameter of the rolling balls 4 for compensation. In addition, it is found that there are shortcomings inherent to such design, first of all, accuracy of dimension of the bearing grooves 21, 51 can not reach as perfect as to a degree of zero error, a certain deviation in dimension of the bearing balls 4 must be allowed for adjusting their preload, second, replacing the rolling balls for regulating preload is a tiresome and time wasting work, and third, assembling the bearing balls 4 which are under preload is also not easy.

Another improved design is shown in FIG. 7, wherein the bearing bush consists of a main bearing bush 6, a sub bearing bush 7, and a preloaded ring 9. Since the preloaded ring 9 is separable from the composition, the adjustment of preload can be carried out by grinding out thickness of preloaded ring 9 without varying dimension of the rolling balls. Even so, the disadvantages existing in the design shown in FIG. 6 still have not been eliminated. In some other designs, an attempt for improvement is made by trying to form the preloaded ring 9 into a combination of two semi-circular preloaded plates. When assembling, at first both preloaded plates are taken out, next, shifting the two bearing bushes 6, 7 toward the center so as to fill the bearing balls 4 into the bearing grooves fully, and finally inserting the two preloaded plates back into respective bearing bushes 6 and 7. If it is desired to make enough room for filling the rolling balls when the two bearing bushes are shifted to the center, the thickness of the preloaded ring 9 must be made considerably thick. To insert two thick preloaded plates into a clearance between two firmly coupled components is not easy. Besides, after having in service for certain time, the preload of ball bushed bearing screw bolt and nut will be lowered due to worn out of the bearing grooves, further, vibration, over load of the mechanism etc., all result in decomposition of the semi-circular preloaded plates which at the final stage, leads to breakdown of the ball bushed bearing screw bolt nut and nut.

SUMMARY OF THE INVENTION

The object of the present invention is for eliminating the disadvantages and inconvenience inherent to the conventional technique as mentioned above such as complicated and bulky structure, less rolling balls, difficult to assembly, and susceptible to decomposition of the semi-circular preloaded plates thereby improving quality and reliability of the product.

To achieve the above mentioned object, the ball bushed bearing screw bolt and nut of the present invention comprises a screw bolt, a ball bearing nut, a main bearing bush, a sub bearing bush, a preloaded ring, a plurality of rolling balls, and a plurality of bearing balls. The surface of the screw bolt is formed with screw threads. The ball bearing nut is coaxially screw combined with the screw bolt. A plurality of rolling balls are provided between the screw bolt and nut for aiding mutual rotation of the two elements. The bearing bush fitting around the nut is constituted by a main bearing bush, a sub bearing bush, and a preloaded ring. Bearing grooves are respectively formed at the outer surface of the ball bearing nut and the inner surfaces of the main bearing bush and the sub bearing bush in transverse direction, and a plurality of bearing balls are provided in each bearing groove for decreasing frictional resistance between the main and sub bearing bushes and the ball bearing nut. The main bearing bush has a flange, while the sub bearing bush has a corresponding fission so that the two bearing bushes can be stably combined together to facilitate assembly work. In order to evade dust infringement into those bearing grooves, a dust ring is installed at each end of the bearing bush. The preloaded ring can be divided into two semi-circular plates. When filling the bearing balls into the left grooves, at first removing the main bearing bush to the left, then filling the bearing balls into the bearing grooves of the nut, and finally returning the main bearing bush to its initial position. Filling of the bearing balls into the right grooves may be accomplished in just the same way as described above except the sub bearing bush is at first removed to the right. Since the two bearing bushes and the bearing balls are loosely coupled, both operations filling the bearing balls and removing the bearing bushes are easy.

DETAILED DESCRIPTION OF THE PREFERRED EMBODIMENT

Figure 1:
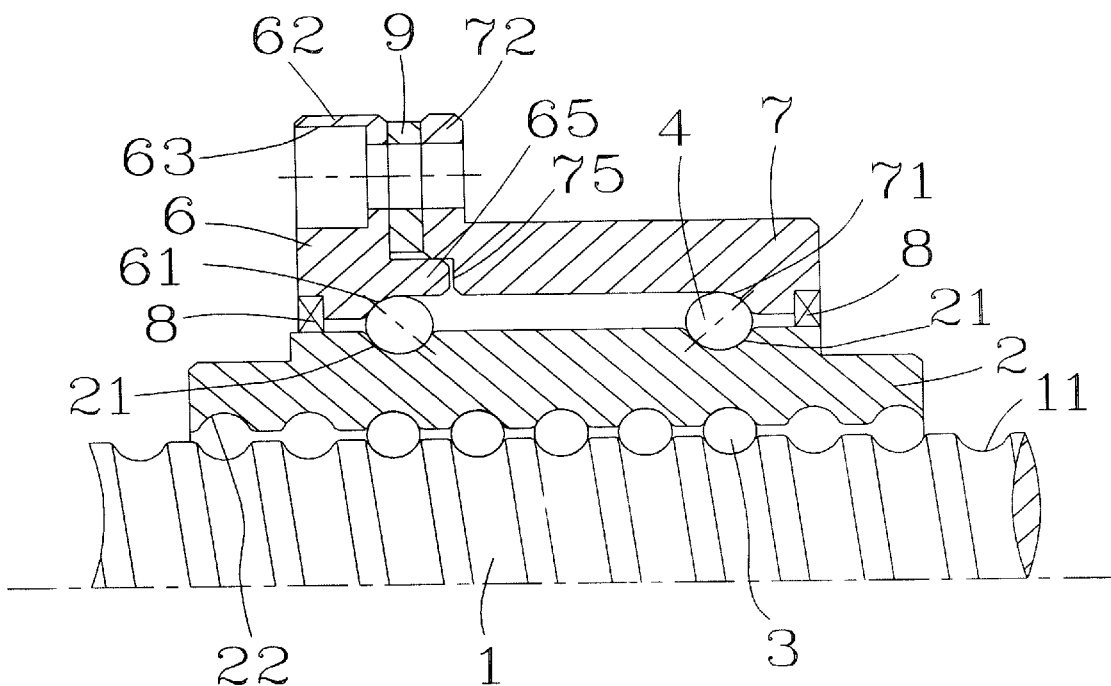
FIG. 1 is a cross sectional view of the present invention.

Referring to FIG. 1, the ball bushed bearing screw bolt and nut of the present invention comprises a screw bolt 1, a ball bearing nut 2, a main bearing bush 6, a sub bearing bush 7, a preloaded ring 9, a plurality of rolling balls 3, and a plurality of bearing balls 4. The surface of the screw bolt 1 is formed with screw threads 11. The ball bearing nut 2 is coaxially screw combined with the screw bolt 1. A plurality of rolling balls 3 are provided between the screw bolt 1 and the ball bearing nut 2 for aiding mutual rotation of the two elements. The bearing bush assembly fitting around the ball bearing nut 2 is constituted by a main bearing bush 6, a sub bearing bush 7, and a preloaded ring 9. Bearing grooves 21, 61, 71 are respectively formed at the outer surface of the ball bearing nut 2 and the inner surfaces of the main and the sub bearing bushes 6 and 7 in transverse direction, and a plurality of bearing balls 4 are provided in all bearing grooves 21, 61, 71, for decreasing frictional resistance between the main and the sub bearing bushes 6,7 and the ball bearing nut 2. The main bearing bushes 6 has a flange 65, while the sub bearing bush 7 has a corresponding fission 75 so that the two bearing bushes 6 and 7 can be stably combined together to facilitate assembly work. In order to evade dust infringement into those bearing grooves 21, 61.71.a dust ring 8 is installed at each of the bearing bushes 6 and 7. The preloaded ring 9 can be divided into two semi-circular plates. When filling the bearing balls 4 into the grooves 21, 61 at the left side, first remove the main bearing bush 6 to the left, then fill the bearing balls 4 into the bearing grooves 21 of the ball bearing nut 2, and finally returning the main bearing bush 6 and its groove 61 to its initial position. Filling of the bearing balls 4 into the grooves 21, 71 at the right side may be accomplished in just the same way as described above except the sub bearing bush 7 is at first removed to the right. Since the two bearing bushes 6 and 7 and the bearing balls 4 are loosely coupled, both operations of filling the bearing balls 4 and removing the bearing bushes 6, 7 are easy.

Figure 2:
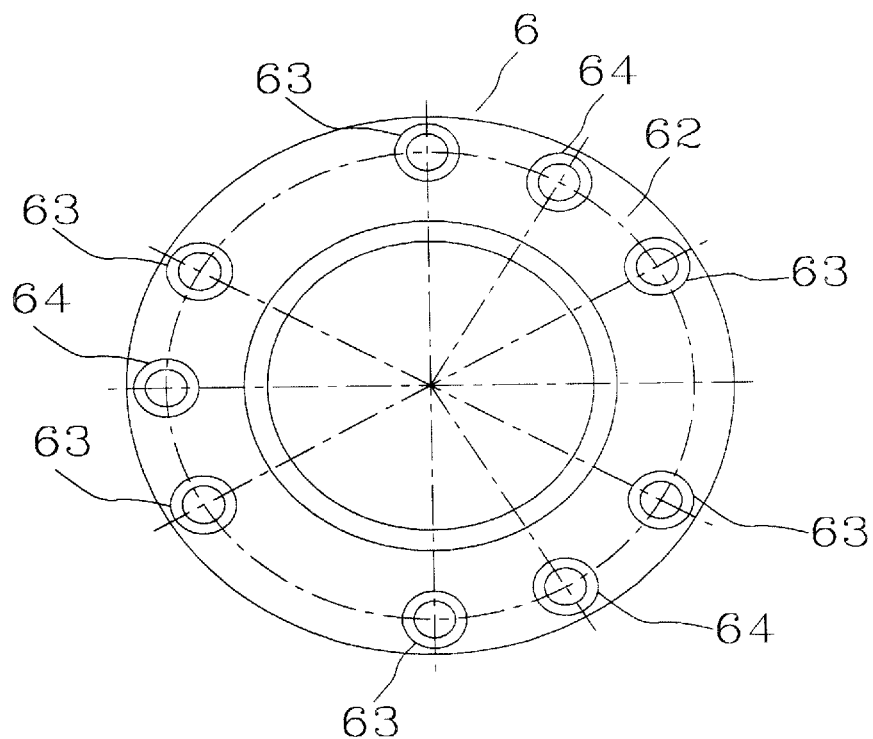
FIG. 2 is a side view of the main bearing bush of the present invention shown in FIG. 1.
Figure 3:
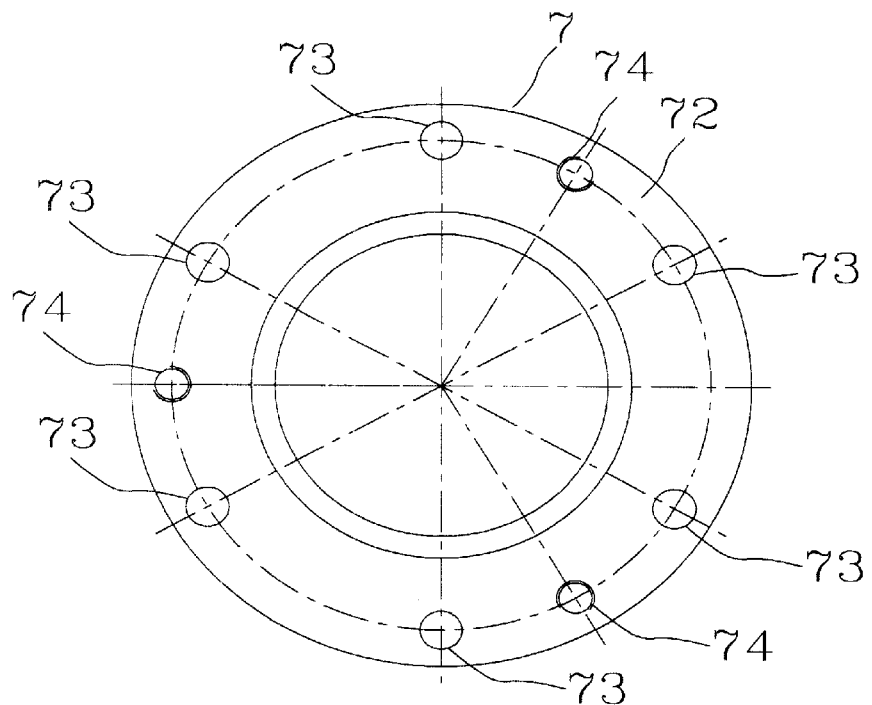
FIG. 3 is a side view of the sub bearing bush of the present invention shown in FIG. 1.
Figure 4:
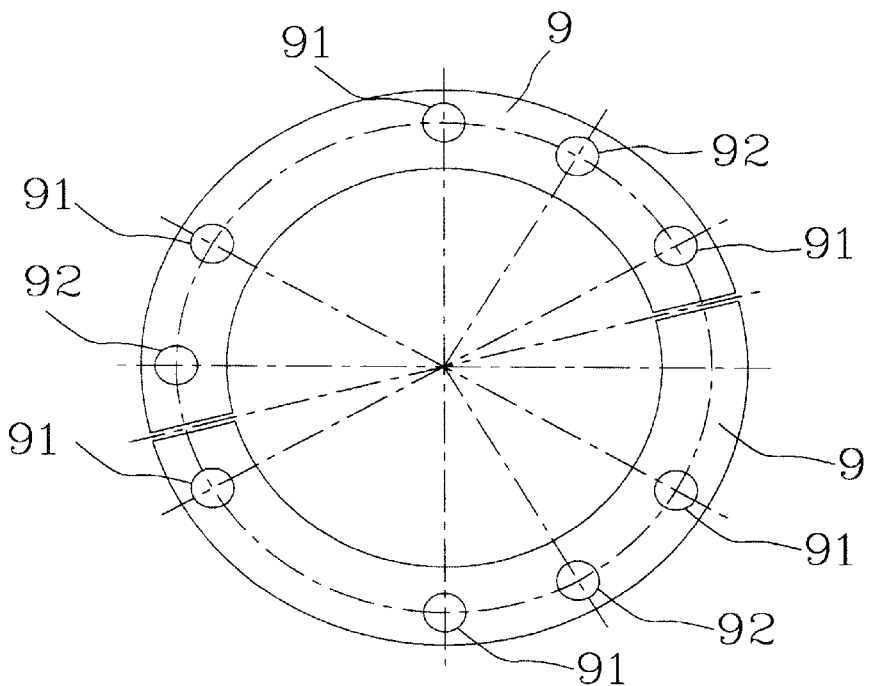
FIG. 4 is a side view of the preloaded ring of the present invention shown in FIG. 1.

The side views of the main bearing bush 6, sub bearing bush 7, and the preloaded ring 9 of the present invention are respectively shown in FIGS. 2, 3 and 4. Flanges 62 and 72 are respectively formed on the main and the sub bearing bushes 6 and 7. A plurality of fixing screw holes 73 and 91 are respectively provided on the flange 72 and the preloaded ring 9, on the other hand, a plurality of sinks 63 are formed on the flange 62 to accept the fixing screws through the fixing screw holes 91 and 73 thereby tightening the bearing bushes 6, 7 to the mechanism. A plurality of preloaded screw holes 74 are formed on the sub bearing bush 7, a plurality of preloaded screw holes 92 are formed on the preloaded ring 9, and plurality of preloaded sinks 64 are formed on the main bearing bush 6. Preloaded screws are inserted into the preloaded skinks 64, passing through preloaded screw holes 92 and tightened at the preloaded screw holes 74.

Meanwhile, there is clearance nearly by the preloaded ring 9 before the preloaded screws are tightened. After the screws are tightened, the clearance disappears and a preload is produced between the two bearing bushes 6 and 7.

The preloaded ring 9 shown in FIG. 4 may be formed into circular shaped, or combination of two semi circular shaped preloaded plates. When it is desired to adjust preload of the bearing bush, the two preloaded plates can be easily taken out only by loosening the preloaded screws, and set them up again after the plates are ground to a proper thickness. The bearing grooves and the bearing balls will inevitably be worn out a little bit after having served a certain time, the accompanied weakening of preload can be rectified by adjusting the thickness of the preloaded ring by means of grinding. In this case, reaching of the preloaded ring is performed at first loosening the fixing screws to separate the screw bolt and nut assembly from the mechanism, and next loosening the preloaded screws.

Incidentally. The present invention has a significant advantage that there is no existing preload between the two bearing bushes before the preloaded screws are applied to the two bearing bushes. This facilitates assembling the bearing balls and the preloaded ring or plates very much, whereas the preloaded plates employed by the conventional technique must be assembled under preloaded states. As it can be imagined how difficult it is to insert two preloaded plates into two bearing bushes Moreover, the preloaded plates of the present invention are provided with preloaded screw holes 92 thereon with preloaded screws passing through which assuredly protect the preloaded plates from decomposition during operation.

Figure 5:
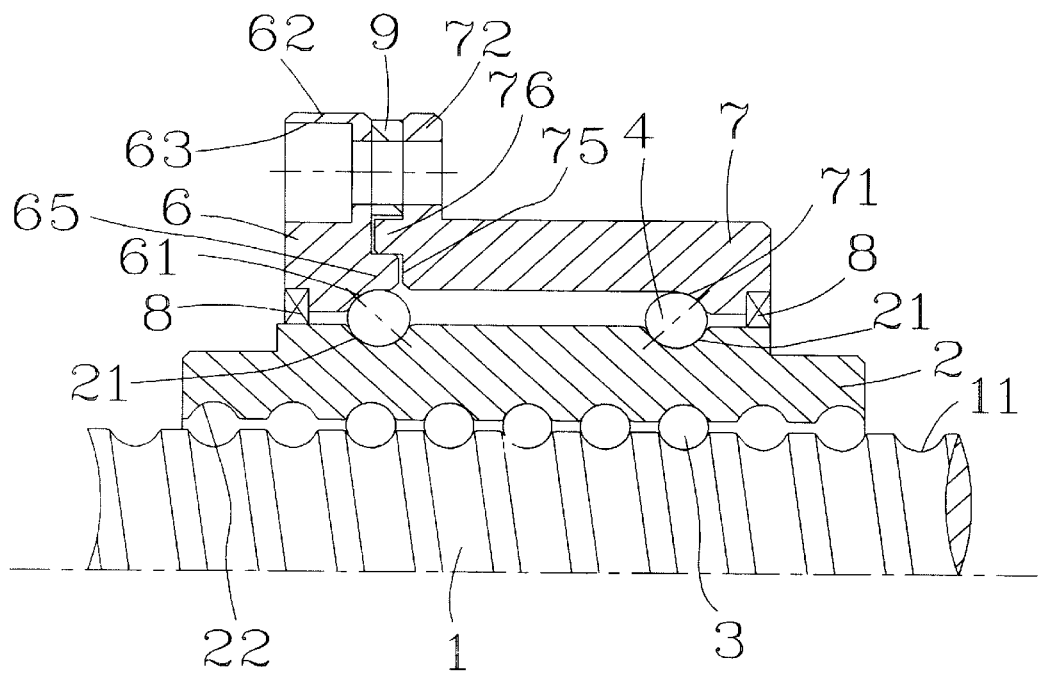
FIG. 5 is a drawing of the present invention in another embodiment.
Figure 6:
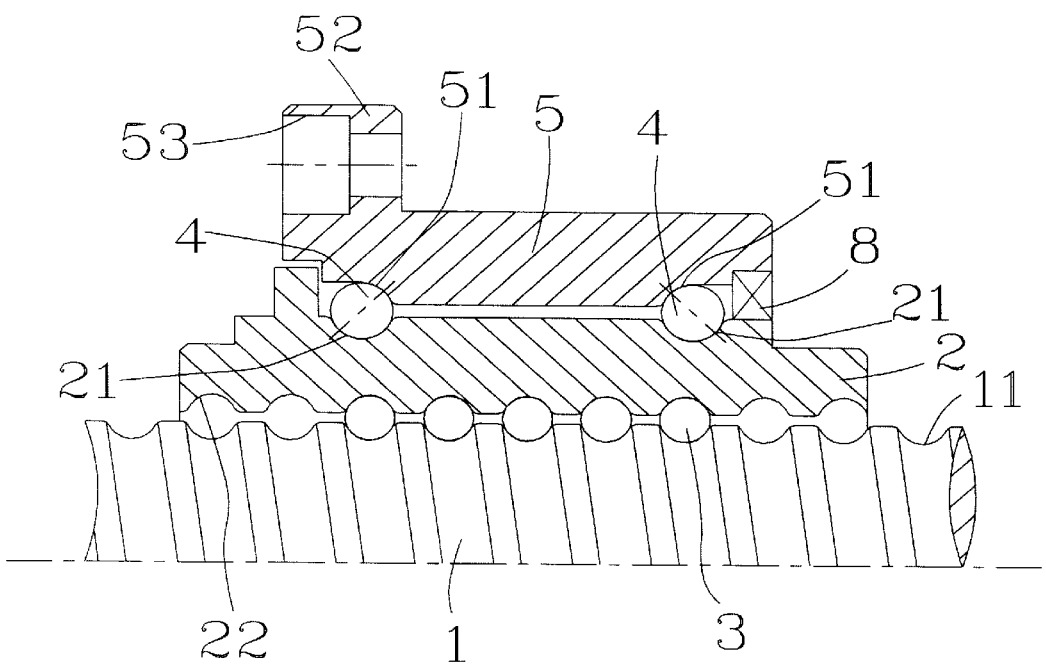
FIG. 6 is a drawing of a conventional ball bushed bearing screw bolt and nut.
Figure 7:
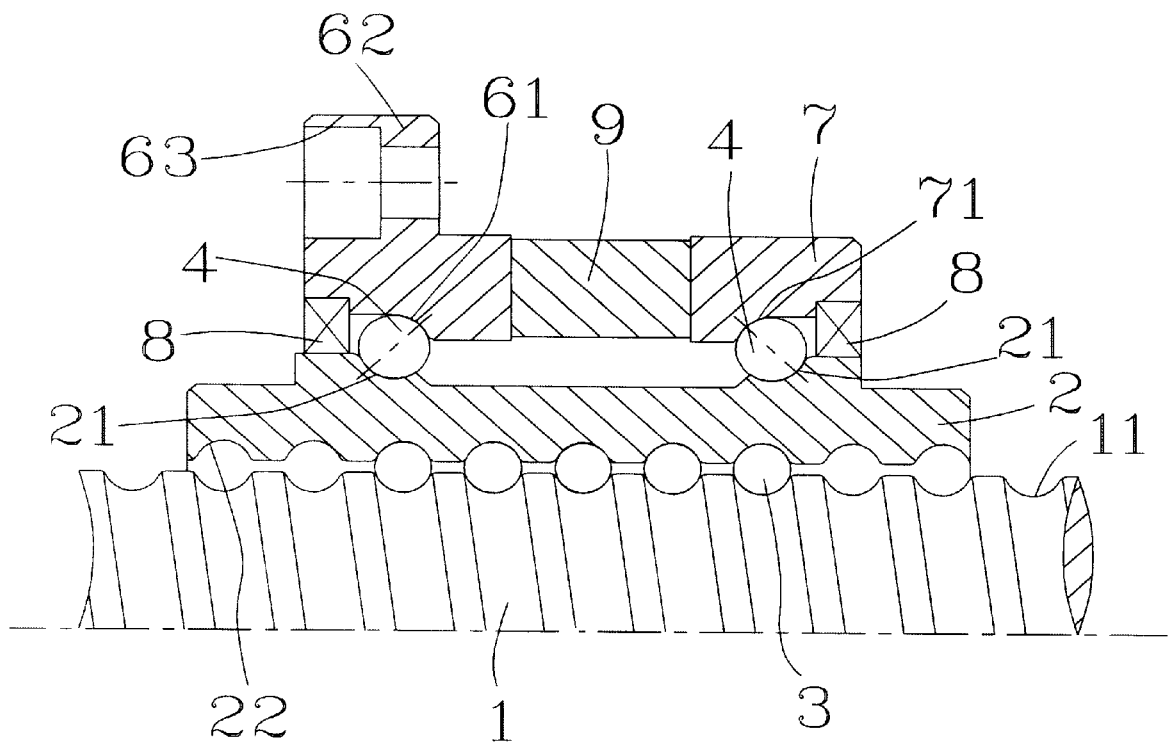
FIG. 7 is a drawing of another conventional ball bushed bearing screw bolt and nut.

FIG. 5 shows another embodiment of the present invention in which further improvement is made. As shown in FIG. 5, a flange 76 having a diameter approximately equal to that of the flange 65 is formed on the sub bearing bush 7 close to the contacting place with the preloaded ring 9. With this construction, the reliability of coupling between the two bearing bushes 6 and 7 is much better with the aid of engagement of the flanges 76 and 65. However, this design will by no means weaken the strength of another flange 72 which is formed to enhance the strength of the sub bearing bush 7 because the fission 75 formed thereat is shallow, on the contrary, the dimension of sub bearing bush 7 is minimized.

The present invention is not limited to the above embodiments, and it is clearly understood that many variations can be made within the scope and spirit of the present invention by anyone skilled in the art.

What is claimed is:

1. A ball bushed bearing screw bolt and nut comprising a screw bolt, a ball bearing nut, a main bearing bush, a sub bearing bush, a preloaded ring, a plurality of rolling balls, a plurality of bearing balls, and a plurality of preloaded screws, wherein:

the surface of said screw bolt is formed with screw threads, said ball bearing nut is coaxially screw combined with said screw bolt with said rolling balls rotatably interposed therebetween;

said main bearing bush having a flange thereon is fitted around said ball bearing nut and has an annular bearing groove formed transversely on an inner surface thereof;

said sub bearing bush having a flange thereon is fitted around said ball bearing nut and has an annular bearing groove formed transversely on an inner surface thereof;

the outer surface of said ball bearing nut has two annular bearing grooves formed transversely thereon, the two annular bearing grooves corresponding to the annular bearing grooves of the main and sub bearing bushes;

said bearing balls are interposed between said bearing bushes and said ball bearing nut and within the corresponding annular grooves thereof;

said preloaded ring is formed into a thin circular plate with a pair of side surfaces parallel to each other contacting respectively said flanges of said main and said sub bearing bushes; and said preloaded ring is provided with a plurality of preloaded through screw holes, while the flanges on said main and said sub bearing bushes are provided with a plurality of preloaded through screw holes and a plurality of sink holes for tightening with screws.

2. The ball bushes bearing screw bolt and nut of claim 1, wherein said circular preloaded ring is formed of two semi circular elements combined together.

3. The ball bushed bearing screw bolt and nut of claim 1, wherein a fission is formed on said sub bearing bush corresponding to another flange formed on said main bearing bush.

4. The ball bushed bearing screw bolt and nut of claim 1, wherein the diameter of said flange formed on said sub bearing bush close to the contacting place with said preloaded ring is approximately equal to diameter of said flange of said main bearing bush.

5. The ball bushed bearing screw bolt and nut of claim 1, wherein a dust ring is provided at each end of said main and sub bearing bushes for preventing infringement of dust into said bearing grooves.

* * * * *